United States Patent
Govardhanam

(10) Patent No.: US 12,481,806 B2
(45) Date of Patent: Nov. 25, 2025

(54) GENERATING SIMULATIONS BASED ON REAL-WORLD SCENARIOS

(71) Applicant: GM CRUISE HOLDINGS LLC, San Francisco, CA (US)

(72) Inventor: Hariprasad Govardhanam, Fremont, CA (US)

(73) Assignee: GM CRUISE HOLDINGS LLC, San Francisco, CA (US)

(*) Notice: Subject to any disclaimer, the term of this patent is extended or adjusted under 35 U.S.C. 154(b) by 1010 days.

(21) Appl. No.: 17/556,479

(22) Filed: Dec. 20, 2021

(65) Prior Publication Data
US 2023/0195958 A1 Jun. 22, 2023

(51) Int. Cl.
*G06F 30/20* (2020.01)
*G06F 16/9035* (2019.01)
*G07C 5/00* (2006.01)

(52) U.S. Cl.
CPC .......... *G06F 30/20* (2020.01); *G06F 16/9035* (2019.01); *G07C 5/008* (2013.01)

(58) Field of Classification Search
CPC ...... G06F 30/20; G06F 16/9035; G07C 5/008
USPC .......................................................... 703/8
See application file for complete search history.

(56) References Cited

U.S. PATENT DOCUMENTS

| | | | |
|---|---|---|---|
| 2020/0160172 A1* | 5/2020 | Fang | G06N 3/08 |
| 2020/0293041 A1* | 9/2020 | Palanisamy | G06N 3/08 |
| 2021/0192219 A1* | 6/2021 | Agarwal | G06V 20/10 |

OTHER PUBLICATIONS

Alnaser_2021 (Autonomous Vehicle Scenario Testing Framework and Model of Computation: On Generation and Coverage Apr. 19, 2021) (Year: 2021).*
Chen_2020 (Formal Modeling and Automatic Generation of Test Cases for the Autonomous Vehicle HAL Open Science, Apr. 28, 2021). (Year: 2021).*

* cited by examiner

*Primary Examiner* — Brian S Cook
(74) *Attorney, Agent, or Firm* — CANTOR COLBURN LLP

(57) ABSTRACT

System, methods, and computer-readable media for processing real-world environments into feature vectors that can be randomly selected into a synthetic scene. Scene data is provided to a generative machine-learning network that processes road types, environment lighting conditions, object behaviors, and AV trajectories of an AV driving scene from the sensor data into feature embeddings that represent such features from the driving scenes. The feature embeddings may be stored as unique character profiles in a scene database to be randomly selected into the synthetic scene.

17 Claims, 5 Drawing Sheets

GENERATING SIMULATIONS BASED ON REAL-WORLD SCENARIOS

TECHNICAL FIELD

The subject technology provides solutions for improving simulation generation and in particular, for improving simulation generation using feature vectors that correspond to real-world scenarios.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

Autonomous vehicles make better decisions based on prediction models that are trained in simulated environments that reflect the real world. Such simulated environments can be improved to better reflect the real world and result in better prediction models for autonomous vehicles.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
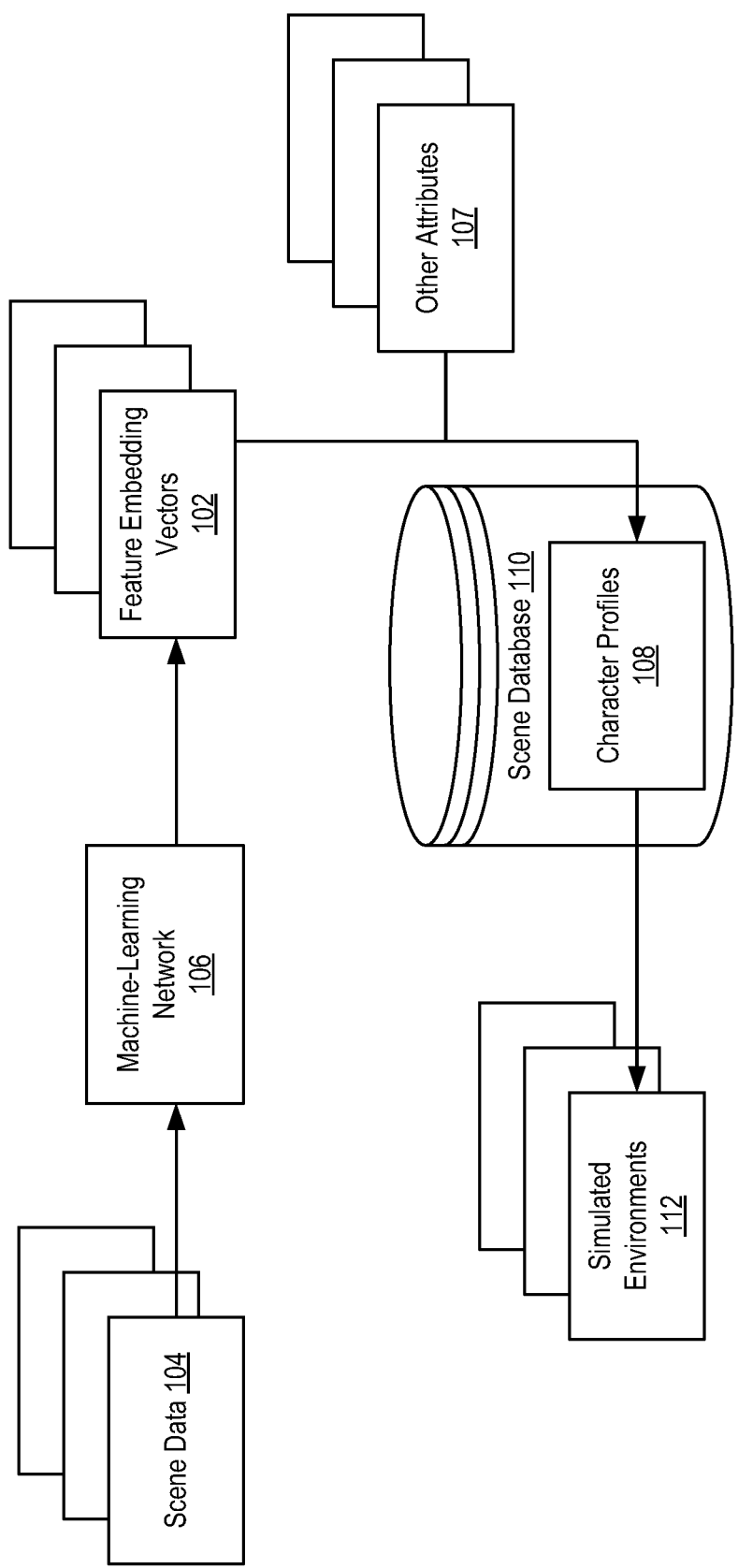
FIG. 1 shows an example setup of a machine-learning network that can produce character profiles for generating a simulated environment, in accordance with some aspects of the present technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs) are commonly outfitted with sensors used to collect scene data about a surrounding environment. In common driving scenarios, the collected data can include information pertaining to the environment, such as the kind of road the AV is traveling on and the impact of lighting on visibility, as well as various objects in the environment, including but not limited to moving objects, such as other vehicles, pedestrians, or other Vulnerable Road Users (VRUs).

In some implementations, the collected environmental data can include trajectory data associated with object motion through the environment. For example, trajectory data can include position/location/orientation information for an object at different times, and/or kinematic information pertaining to velocity and/or acceleration metrics for the object. In typical simulation training (e.g., by the AI/ML platform 454 and/or the simulation platform 456 in reference to FIG. 4), random scene objects and scene attributes may be selected to generate a random scene for training an Autonomous Vehicle (AV) stack. Random generation of scene attributes may be adding random trajectory and velocity vectors to a random object. However, one limitation of generating such conventional synthetic scenes is that the number of useless and infeasible scenes may increase dramatically.

Aspects of the disclosed technology address some of the limitations of conventional simulation systems for driving scenes by providing solutions for processing real-world environments into feature vectors that can be randomly selected into a synthetic scene. In some approaches, scene data can be provided to a generative machine-learning network, such as a Generative Adversarial Network (GAN), that includes an auto-encoder, e.g., one or more auto-encoding layers. The generative machine-learning network may include heuristic algorithms that process a road type and an environment lighting condition of an AV driving scene from the sensor data into feature embeddings that represent such features from the driving scene. Feature embeddings that may be produced by the auto-encoder can be used to represent object behaviors, and in some implementations can be used to help classify or identify newly encountered or rare behavioral events. In some aspects, the feature embeddings may be stored as unique character profiles in a scene database.

The autoencoder neural network for outputting feature embedding vectors representing one or more behavioral attributes with respect to trajectories of an object of the present technology solves at least these problems and provides other benefits, as will be apparent from the figures and description provided herein.

FIG. 1 illustrates an example setup 100 of a machine-learning network that can produce feature embedding attributes (or feature embedding vectors) 102 that are stored as character profiles used to generate simulated environments. In some implementations, training can be performed on scene data 104, which may be extracted from map data and sensor data, such as Light Detection and Ranging (LiDAR), Radio Detection And Ranging (RADAR), and camera data associated with a given scene. The map data may include raw map data and semantic map data. Scene data based on ground truth data may comprise a road type, environment brightness, object behavior, and an AV driving direction, and the feature embedding attributes may represent such features of the driving scene.

The scene data may then be provided to a generative machine-learning network 106 that produces semantic (vector) representations of intrinsic characteristics, i.e., feature embedding vectors 102. In some aspects, the feature embedding vectors 102 can be used to characterize or classify one or more characteristics associated with the corresponding scene attributes. These semantic characteristics (or feature embeddings) can be represented as vectors encoded in one or more layers of a machine-learning model. Other attributes 107, such as type of object, location of the object, speed of the object, and other such attributes may be quantified into numerical features that are appended to the feature embedding vectors 102. The feature embedding vectors 102 with appended attributes may be stored in a scene database 110 as character profiles 108 that are unique representations of the corresponding scene attribute. A simulated environment may be generated from a random selection of various unique character profiles from the scenes database 110.

For training an Autonomous Vehicle (AV) stack, there may be a lot of trajectories of objects that the AV cannot recognize. When predictions are incorrect, corrective measures may be implemented to better the prediction. However, using a current method of writing heuristic rules for each common behavior, less common behavior trajectories may not be considered.

In determining the behavior of an object, object trajectory data, which may include semantic map data about the environment (i.e., an intersection), and positioning, orientation, and trajectory of the object, is used as input in an autoencoder neural network of the machine-learning network 106. In some aspects, the autoencoder neural network can be configured to generate feature embeddings that can each be used as a unique identifier for each behavior. Once feature embeddings have been generated from multiple sets of trajectory data (e.g., for multiple objects and/or behavioral instances), the feature embeddings can be stored in the scene database as character profiles 108. As such, feature embedding vectors 102 per behavior instance associated with rare events may also be captured.

Figure 2:
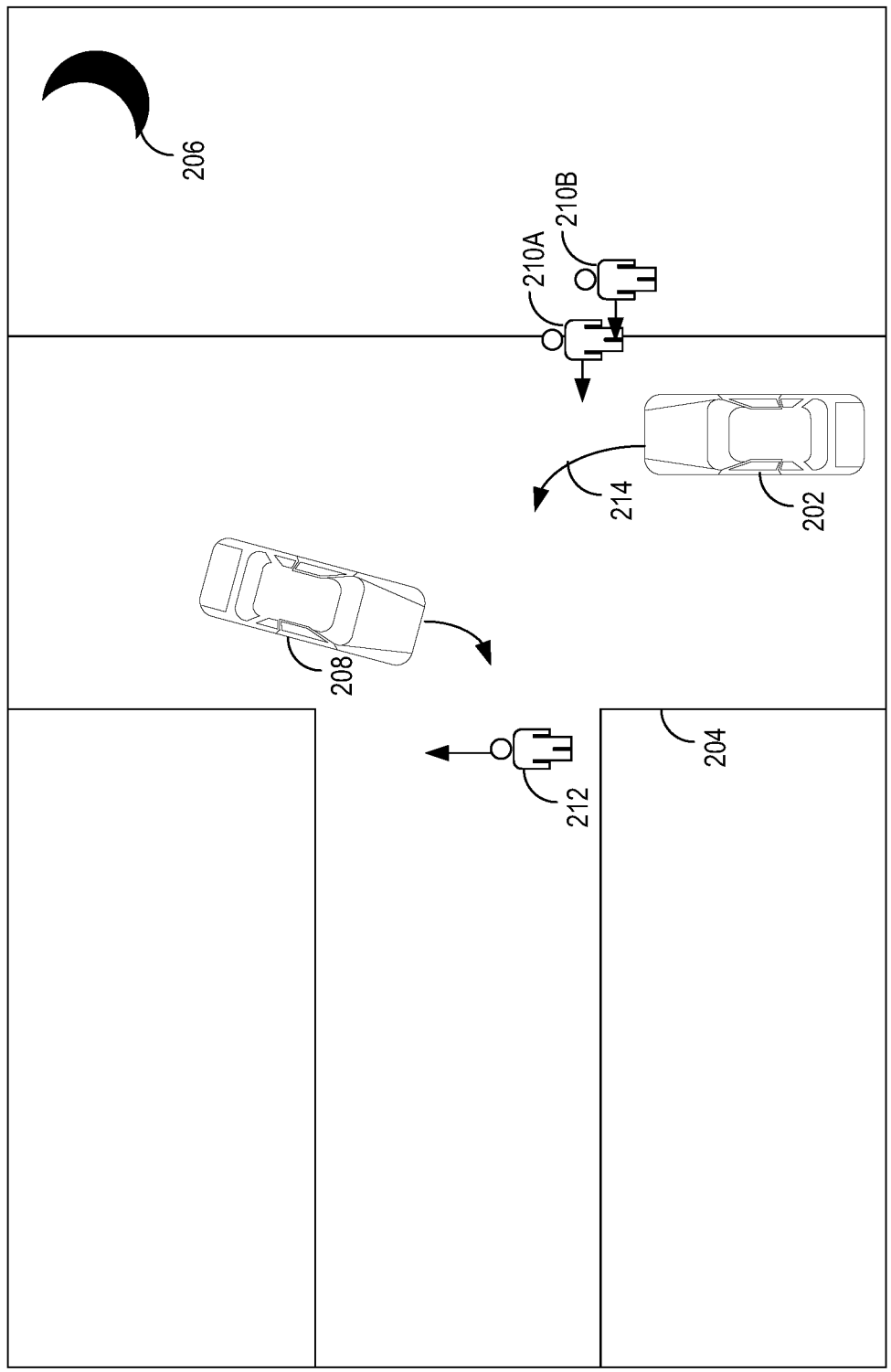
FIG. 2 shows an example simulated environment generated based on a random selection of character profiles from a database, in accordance with some aspects of the present technology.

FIG. 2 illustrates an example simulated environment 200 based on character profile stores in the scene database. The simulated environment 200 includes a T-intersection 204 and a dim brightness level 206, such as one that represents a dark but clear night. A simulated AV 202 may be in the simulated environment 200. The simulated environment also includes moving objects (pedestrians, vehicles, etc.) that may require the simulated AV 202 to change its trajectory.

FIG. 2 further illustrates a vehicle 208 that is turning into the same lane as the simulated AV 202, a first pedestrian 212 walking a crosswalk overlapping with the trajectory of the simulated AV 202 and the vehicle 208, and a second and a third pedestrian 210A, 201B waiting to walk onto a crosswalk overlapping the trajectory of the simulated AV 202 at a closer point. All of these character profiles may have been randomly selected at random quantities to generate a random scene that is based on scene attributes that have occurred in a real-world environment, increasing the chances of such a simulated scene being a realistic real-world representation. The scene vector that represents the example generated scene 200 may be a string of numeral values wherein each value represents how many of a particular character profile appear in the example generated scene 200.

For example, the string of numeral values may be 38101000 . . . 0001000 . . . 000200 . . . 000100. The "3" may represent the T-intersection 204, the "8" may represent the dim brightness level 206, and the first "1" may represent that the AV is driving forward. The next "1" may represent that there is 1 oncoming vehicle turning into the same lane as the simulated AV 202. The next "2" may represent that there are 2 pedestrians with trajectories crossing immediately across the trajectory of the AV 202. The last one "1" may represent one pedestrian crossing in the trajectory of the AV 202 further out. The rest of the 0s represent that none of the other character profiles are present in this example generated scene 200.

Figure 3:
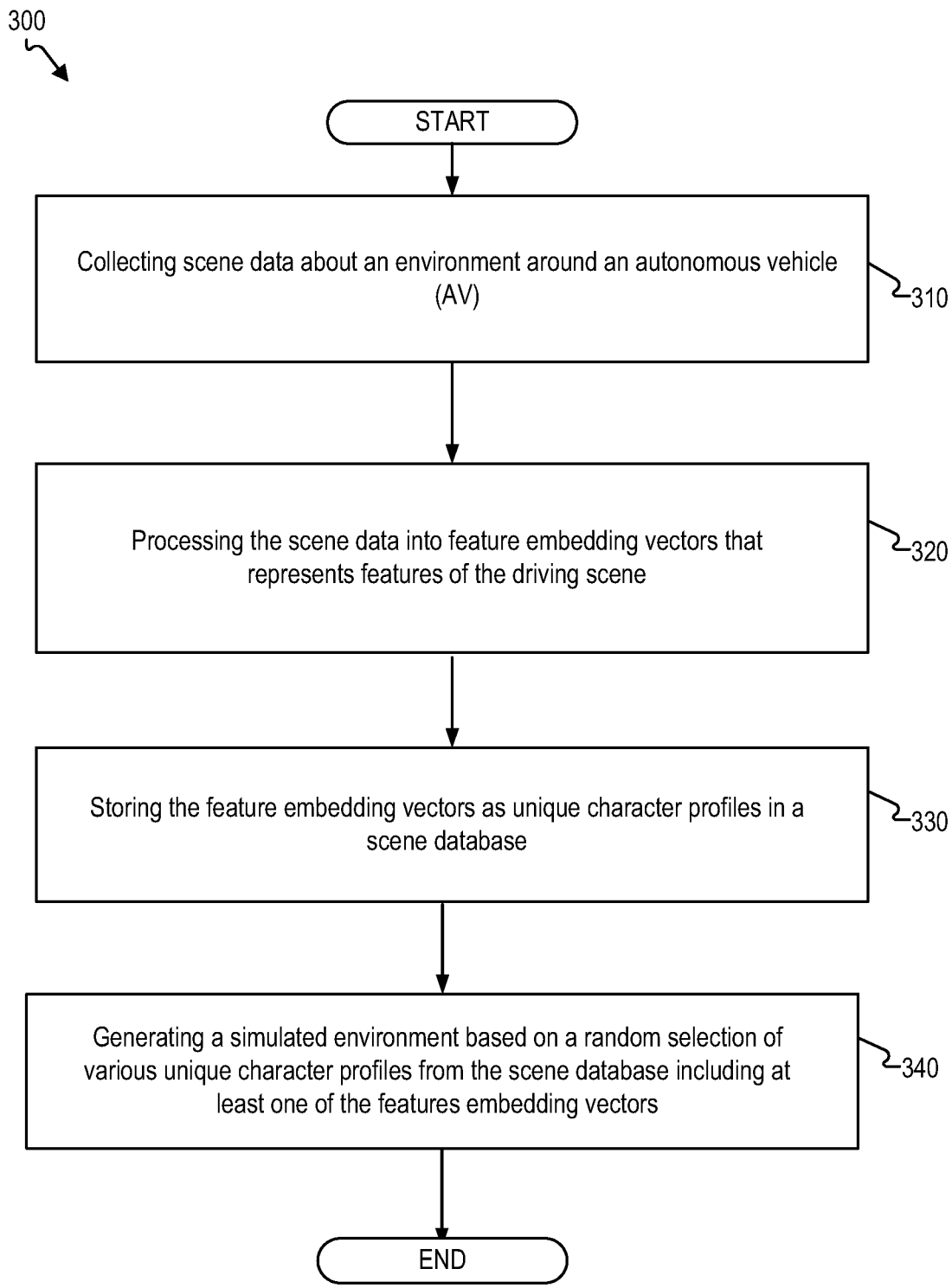
FIG. 3 shows a flow diagram of an example process for producing character profiles for generating a simulated environment, in accordance with some aspects of the present technology.

FIG. 3 illustrates an example method 300 for producing character profiles for generating a simulated environment. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some aspects, the computer-implemented method includes collecting scene data about an environment around an autonomous vehicle (AV at step 310. For example, the sensor systems 404, 406, 408 illustrated in FIG. 4 may collect scene data about an environment around an autonomous vehicle (AV. In some aspects, the scene data represents a driving scene encountered by the AV.

According to some aspects, the computer-implemented method includes processing the scene data into feature embedding vectors that represent features of the driving scene at step 320. For example, the data center 450 illustrated in FIG. 4 may process the scene data into feature embedding vectors that represent features of the driving scene.

According to some aspects, the computer-implemented method includes storing the feature embedding vectors as character profiles in a scene database at step 330. For example, the data center 450 illustrated in FIG. 4 may store the feature embed vectors as character profiles in a scene database.

According to some aspects, the computer-implemented method includes generating a simulated environment based on a random selection of various unique character profiles from the scene database including at least one of the features embedding vectors at step 340. For example, the simulation platform 456 illustrated in FIG. 4 may generate a simulated environment based on a random selection of various unique character profiles from the scene database including at least one of the features embedding vectors.

According to some aspects, the computer-implemented method includes storing a plurality of feature vectors to a scene database. For example, the data center 450 illustrated in FIG. 4 may store a plurality of feature vectors to a scene database. In some aspects, each of the plurality of feature vectors represents a road type, an environment lighting condition, one or more object types and respective trajectories, a direction of the AV, or a combination thereof.

According to some aspects, the computer-implemented method includes generating the simulated environment based on a random selection of various unique character profiles from the database. For example, the simulation platform 456 illustrated in FIG. 4 may generate the simulated environment based on a random selection of various unique character profiles from the database.

According to some aspects, the computer-implemented method includes classifying the road type, the environment lighting condition, and the trajectory of the AV as one of a finite number of feature vectors using heuristic rules. For example, the data center 450 illustrated in FIG. 4 may classify the road type, the environment lighting condition, and the trajectory of the AV as one of a finite number of feature vectors using heuristic rules.

According to some aspects, the computer-implemented method includes converting the one or more object types and the respective trajectories into feature vectors based on providing sensor data corresponding with a trajectory of a respective object through a respective environment to an autoencoder neural network to generate a respective vector representing one or more behavioral attributes of the object in the environment. For example, the data center 450 illustrated in FIG. 4 may convert the one or more object types and the respective trajectories into feature vectors based on providing sensor data corresponding with a trajectory of a respective object through a respective environment to an autoencoder neural network to generate a respective vector representing one or more behavioral attributes of the object in the environment.

Figure 4:
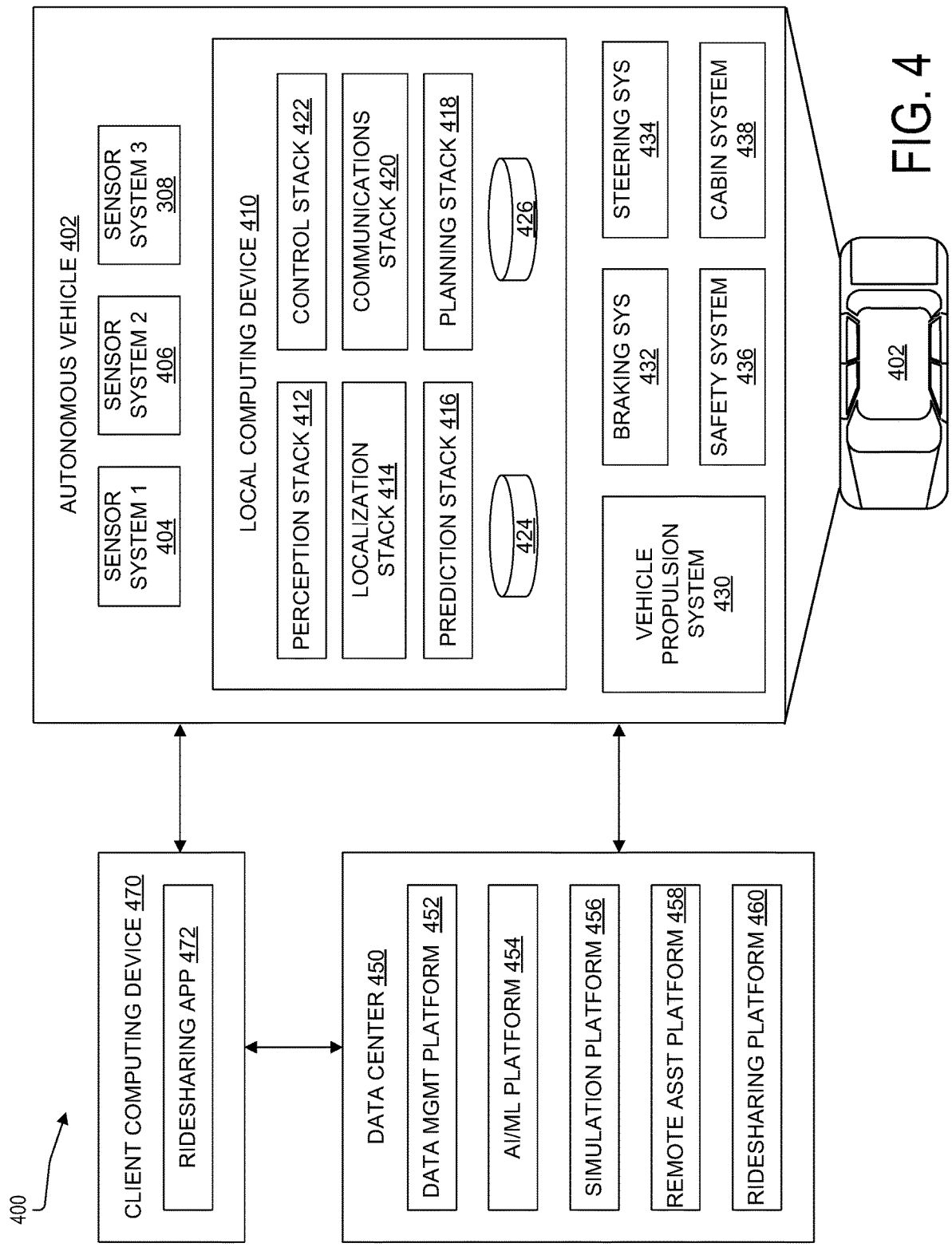
FIG. 4 shows an example of a system for managing one or more Autonomous Vehicles (AVs) data in accordance with some aspects of the present technology.

FIG. 4 illustrates an example of an AV management system 400. One of ordinary skill in the art will understand that, for the AV management system 400 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 402 can navigate roadways without a human driver based on sensor signals generated by multiple sensor systems 404, 406, and 408. The sensor systems 404-408 can include different types of sensors and can be arranged about the AV 402. For instance, the sensor systems 404-408 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other embodiments may include any other number and type of sensors.

The AV 402 can also include several mechanical systems that can be used to maneuver or operate the AV 402. For instance, the mechanical systems can include a vehicle propulsion system 430, a braking system 432, a steering system 434, a safety system 436, and a cabin system 438, among other systems. The vehicle propulsion system 430 can include an electric motor, an internal combustion engine, or both. The braking system 432 can include an engine brake, brake pads, actuators, and/or any other suitable componentry configured to assist in decelerating the AV 402. The steering system 434 can include suitable componentry configured to control the direction of movement of the AV 402 during navigation. The safety system 436 can include lights and signal indicators, a parking brake, airbags, and so forth. The cabin system 438 can include cabin temperature control systems, in-cabin entertainment systems, and so forth. In some embodiments, the AV 402 might not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces (e.g., Graphical User Interfaces (GUIs), Voice User Interfaces (VUIs), etc.) for controlling certain aspects of the mechanical systems 430-438.

The AV 402 can additionally include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a mapping and localization stack 414, a prediction stack 416, a planning stack 418, a communications stack 420, a control stack 422, an AV operational database 424, and an HD geospatial database 426, among other stacks and systems.

The perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the mapping and localization stack 414, the HD geospatial database 426, other components of the AV, and other data sources (e.g., the data center 450, the client computing device 470, third party data sources, etc.). The perception stack 412 can detect and classify objects and determine their current locations, speeds, directions, and the like. In addition, the perception stack 412 can determine the free space around the AV 402 (e.g., to maintain a safe distance from other objects, change lanes, park the AV, etc.). The perception stack 412 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 414 can determine the AV's position and orientation (pose) using different methods from multiple systems (e.g., GPS, IMUs, cameras, LIDAR, RADAR, ultrasonic sensors, the HD geospatial database 426, etc.). For example, in some embodiments, the AV 402 can compare sensor data captured in real-time by the sensor systems 404-408 to data in the HD geospatial database 426 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

The prediction stack 416 can receive information from the localization stack 414 and objects identified by the perception stack 412 and predict a future path for the objects. In some embodiments, the prediction stack 416 can output several likely paths that an object is predicted to take along with a probability associated with each path. For each predicted path, the prediction stack 416 can also output a range of points along the path corresponding to a predicted location of the object along the path at future time intervals along with an expected error value for each of the points that indicates a probabilistic deviation from that point.

The planning stack 418 can determine how to maneuver or operate the AV 402 safely and efficiently in its environment. For example, the planning stack 418 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 402 from one point to another and outputs from the perception stack 412, localization stack 414, and prediction stack 416. The planning stack 418 can determine multiple sets of one or more mechanical operations that the AV 402 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 418 can select from multiple backup plans to carry out. For example, while preparing to change lanes to turn right at an intersection, another vehicle may aggressively cut into the destination lane, making the lane change unsafe. The planning stack 418 could have already determined an alternative plan for such an event. Upon its occurrence, it could help direct the AV 402 to go around the block instead of blocking a current lane while waiting for an opening to change lanes.

The control stack 422 can manage the operation of the vehicle propulsion system 430, the braking system 432, the steering system 434, the safety system 436, and the cabin system 438. The control stack 422 can receive sensor signals from the sensor systems 404-408 as well as communicate with other stacks or components of the local computing device 410 or a remote system (e.g., the data center 450) to effectuate operation of the AV 402. For example, the control stack 422 can implement the final path or actions from the multiple paths or actions provided by the planning stack 418. This can involve turning the routes and decisions from the planning stack 418 into commands for the actuators that control the AV's steering, throttle, brake, and drive unit.

The communications stack 420 can transmit and receive signals between the various stacks and other components of the AV 402 and between the AV 402, the data center 450, the client computing device 470, and other remote systems. The communications stack 420 can enable the local computing device 410 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 420 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 426 can store HD maps and related data of the streets upon which the AV 402 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 424 can store raw AV data generated by the sensor systems 404-408, stacks 412-422, and other components of the AV 402 and/or data received by the AV 402 from remote systems (e.g., the data center 450, the client computing device 470, etc.). In some embodiments, the raw AV data can include HD LIDAR point cloud data, image data, RADAR data, GPS data, and other sensor data that the data center 450 can use for creating or updating AV geospatial data or for creating simulations of situations encountered by AV 402 for future testing or training of various machine learning algorithms that are incorporated in the local computing device 410.

The data center 450 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 450 can include one or more computing devices remote to the local computing device 410 for managing a fleet of AVs and AV-related services. For example, in addition to managing the AV 402, the data center 450 may also support a ridesharing service, a delivery service, a remote/roadside assistance service, street services (e.g., street mapping, street patrol, street cleaning, street metering, parking reservation, etc.), and the like.

The data center 450 can send and receive various signals to and from the AV 402 and the client computing device 470. These signals can include sensor data captured by the sensor systems 404-408, roadside assistance requests, software updates, ridesharing pick-up and drop-off instructions, and so forth. In this example, the data center 450 includes a data management platform 452, an Artificial Intelligence/Machine Learning (AI/ML) platform 454, a simulation platform 456, a remote assistance platform 458, and a ridesharing platform 460, among other systems.

The data management platform 452 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ridesharing platform 460, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

The simulation platform 456 can enable testing and validation of the algorithms, machine learning models, neural networks, and other development efforts for the AV 402, the remote assistance platform 458, the ridesharing platform 460, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from a cartography platform; modeling the behavior of other vehicles, bicycles, pedestrians, and other dynamic elements; simulating inclement weather conditions, different traffic scenarios; and so on.

The remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

The ridesharing platform 460 can interact with a customer of a ridesharing service via a ridesharing application 472 executing on the client computing device 470. The client computing device 470 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general-purpose computing device for accessing the ridesharing application 472. The client computing device 470 can be a customer's mobile computing device or a computing device integrated with the AV 402 (e.g., the local computing device 410). The ridesharing platform 460 can receive requests to pick up or drop off from the ridesharing application 472 and dispatch the AV 402 for the trip.

Figure 5:
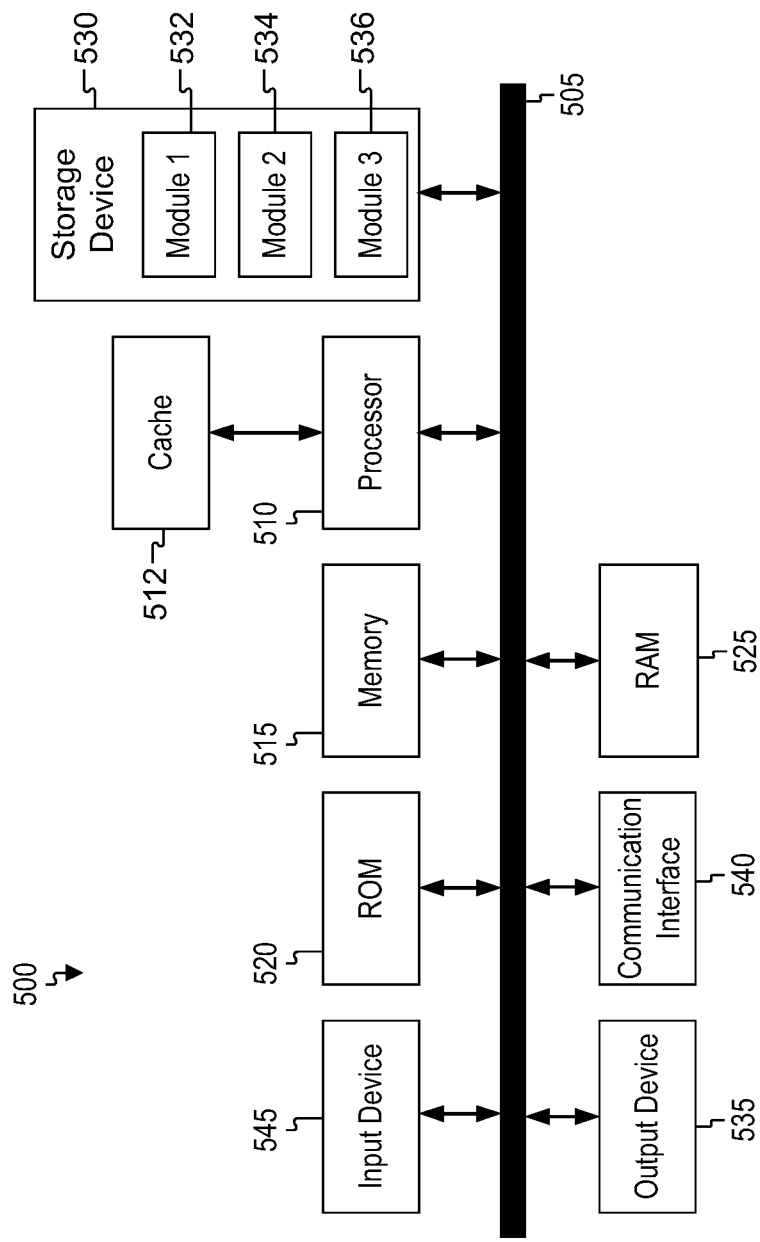
FIG. 5 shows an example system for implementing certain aspects of the present technology.

FIG. 5 shows an example of computing system 500, which can be for example any computing device making up the data center 450, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A computer-implemented method comprising: collecting scene data about an environment around an autonomous vehicle (AV), wherein the scene data represents a driving scene encountered by the AV; processing the scene data into feature embedding vectors that represent features of the driving scene; storing the feature embedding vectors as character profiles in a scene database; and generating a simulated environment based on a random selection of various unique character profiles from the scene database including at least one of the features embedding vectors.

Aspect 2: The computer-implemented method of Aspect 1, wherein the represented features include a road type, an environment lighting condition, one or more object types, a trajectory of the AV, or a combination thereof.

Aspect 3: The computer-implemented method of any of Aspects 1 to 2, further comprising: storing a plurality of feature vectors to a scene database, wherein each of the plurality of feature vectors represents a road type, an environment lighting condition, one or more object types and respective trajectories, a direction of the AV, or a combination thereof.

Aspect 4: The computer-implemented method of any of Aspects 1 to 3, wherein each of the plurality of feature vectors comprises a string of numbers, each number corresponding to how many times a respective character profile appears in a corresponding environment.

Aspect 5: The computer-implemented method of any of Aspects 1 to 4, wherein the corresponding environment is a simulated environment, the computer-implemented method further comprising: generating the simulated environment based on a random selection of various unique character profiles from the database.

Aspect 6: The computer-implemented method of any of Aspects 1 to 5, further comprising: classifying the road type, the environment lighting condition, and the trajectory of the AV as one of a finite number of feature vectors using heuristic rules.

Aspect 7: The computer-implemented method of any of Aspects 1 to 6, further comprising: converting the one or more object types and the respective trajectories into feature vectors based on providing sensor data corresponding with a trajectory of a respective object through a respective environment to an autoencoder neural network to generate a respective vector representing one or more behavioral attributes of the object in the environment.

Aspect 8: A system comprising: a storage configured to store instructions; a processor configured to execute the instructions and cause the processor to: collect scene data about an environment around an autonomous vehicle (AV), wherein the scene data represents a driving scene encountered by the AV, process the scene data into feature embedding vectors that represent features of the driving scene, store the feature embed vectors as character profiles in a scene database, and generate a simulated environment based on a random selection of various unique character profiles from the scene database including at least one of the features embedding vectors.

Aspect 9: The system of Aspect 8, wherein the represented features include a road type, an environment lighting condition, one or more object types, a trajectory of the AV, or a combination thereof.

Aspect 10: The system of any of Aspects 8 to 9, wherein the processor is configured to execute the instructions and cause the processor to: store a plurality of feature vectors to a scene database, wherein each of the plurality of feature vectors represents a road type, an environment lighting condition, one or more object types and respective trajectories, a direction of the AV, or a combination thereof.

Aspect 11: The system of any of Aspects 8 to 10, wherein each of the plurality of feature vectors comprises a string of numbers, each number corresponding to how many times a respective character profile appears in a corresponding environment.

Aspect 12: The system of any of Aspects 8 to 11, wherein the processor is configured to execute the instructions and cause the processor to: generate the simulated environment based on a random selection of various unique character profiles from the database.

Aspect 13: The system of any of Aspects 8 to 12, wherein the processor is configured to execute the instructions and cause the processor to: classify the road type, the environment lighting condition, and the trajectory of the AV as one of a finite number of feature vectors using heuristic rules.

Aspect 14: The system of any of Aspects 8 to 13, wherein the processor is configured to execute the instructions and cause the processor to: convert the one or more object types and the respective trajectories into feature vectors based on providing sensor data corresponding with a trajectory of a respective object through a respective environment to an autoencoder neural network to generate a respective vector representing one or more behavioral attributes of the object in the environment.

Aspect 15: A non-transitory computer-readable medium comprising instructions, the instructions, when executed by a computing system, cause the computing system to: collect scene data about an environment around an autonomous vehicle (AV), wherein the scene data represents a driving scene encountered by the AV; process the scene data into feature embedding vectors that represent features of the driving scene; store the feature embed vectors as character profiles in a scene database; and generate a simulated environment based on a random selection of various unique character profiles from the scene database including at least one of the features embedding vectors.

Aspect 16: The non-transitory computer-readable medium of Aspect 15, the represented features include a road type, an environment lighting condition, one or more object types, a trajectory of the AV, or a combination thereof.

Aspect 17: The non-transitory computer-readable medium of any of Aspects 15 to 16, wherein the non-transitory computer-readable medium further comprises instructions that, when executed by the computing system, cause the computing system to: store a plurality of feature vectors to a scene database, wherein each of the plurality of feature vectors represents a road type, an environment lighting condition, one or more object types and respective trajectories, a direction of the AV, or a combination thereof.

Aspect 18: The non-transitory computer-readable medium of any of Aspects 15 to 17, each of the plurality of feature vectors comprises a string of numbers, each number corresponding to how many times a respective character profile appears in a corresponding environment.

Aspect 19: The non-transitory computer-readable medium of any of Aspects 15 to 18, wherein the non-transitory computer-readable medium further comprises instructions that, when executed by the computing system, cause the computing system to: generate the simulated environment based on a random selection of various unique character profiles from the database.

Aspect 20: The non-transitory computer-readable medium of any of Aspects 15 to 19, wherein the non-transitory computer-readable medium further comprises instructions that, when executed by the computing system, cause the computing system to: classify the road type, the environment lighting condition, and the trajectory of the AV as one of a finite number of feature vectors using heuristic rules.

Aspect 21: The non-transitory computer-readable medium of any of Aspects 15 to 20, wherein the non-transitory computer-readable medium further comprises instructions that, when executed by the computing system, cause the computing system to: convert the one or more object types and the respective trajectories into feature vectors based on providing sensor data corresponding with a trajectory of a respective object through a respective environment to an autoencoder neural network to generate a respective vector representing one or more behavioral attributes of the object in the environment.

What is claimed is:

1. A computer-implemented method comprising:
collecting scene data about an environment around an autonomous vehicle (AV), wherein the scene data represents a driving scene encountered by the AV;
processing the scene data into feature embedding vectors that represent features of the driving scene, wherein each of the plurality of feature vectors comprises a string of numbers, each number corresponding to how many times a respective character profile appears in a corresponding environment, wherein the string of numbers comprises a first number representing a presence of a T-intersection, a second number representing a dim brightness level, a third number representing a direction of travel of the AV, a fourth number representing how many oncoming vehicles are turning into a same lane as the AV, a fifth number representing how many pedestrians have trajectories crossing relatively close across a trajectory of the AV, and a sixth number representing how many pedestrians have trajectories crossing relatively far across the trajectory of the AV;
storing the feature embedding vectors as character profiles in a scene database; and
generating a simulated environment based on a random selection of various unique character profiles from the scene database including at least one of the features embedding vectors.

2. The computer-implemented method of claim 1, wherein the represented features include a road type, an environment lighting condition, one or more object types, a trajectory of the AV, or a combination thereof.

3. The computer-implemented method of claim 2, further comprising:
storing a plurality of feature vectors to a scene database, wherein each of the plurality of feature vectors represents a road type, an environment lighting condition, one or more object types and respective trajectories, a direction of the AV, or a combination thereof.

4. The computer-implemented method of claim 3, wherein the corresponding environment is a simulated environment, the computer-implemented method further comprising:
generating the simulated environment based on a random selection of various unique character profiles from the database.

5. The computer-implemented method of claim 2, further comprising:
classifying the road type, the environment lighting condition, and the trajectory of the AV as one of a finite number of feature vectors using heuristic rules.

6. The computer-implemented method of claim 2, further comprising:
converting the one or more object types and the respective trajectories into feature vectors based on providing sensor data corresponding with a trajectory of a respective object through a respective environment to an autoencoder neural network to generate a respective vector representing one or more behavioral attributes of the object in the environment.

7. A system comprising:
a memory configured to store instructions;
a processor configured to execute the instructions and cause the processor to:
collect scene data about an environment around an autonomous vehicle (AV), wherein the scene data represents a driving scene encountered by the AV;
process the scene data into feature embedding vectors that represent features of the driving scene, wherein each of the plurality of feature vectors comprises a string of numbers, each number corresponding to how many times a respective character profile appears in a corresponding environment, wherein the string of numbers comprises a first number representing a presence of a T-intersection, a second number representing a dim brightness level, a third number representing a direction of travel of the AV, a fourth number representing how many oncoming vehicles are turning into a same lane as the AV, a fifth number representing how many pedestrians have trajectories crossing relatively close across a trajectory of the AV, and a sixth number representing how many pedestrians have trajectories crossing relatively far across the trajectory of the AV;
store the feature embed vectors as character profiles in a scene database; and
generate a simulated environment based on a random selection of various unique character profiles from the scene database including at least one of the features embedding vectors.

8. The system of claim 7, wherein the represented features include a road type, an environment lighting condition, one or more object types, a trajectory of the AV, or a combination thereof.

9. The system of claim 8, wherein the processor is configured to execute the instructions and cause the processor to:
store a plurality of feature vectors to a scene database, wherein each of the plurality of feature vectors represents a road type, an environment lighting condition, one or more object types and respective trajectories, a direction of the AV, or a combination thereof.

10. The system of claim 9, wherein the processor is configured to execute the instructions and cause the processor to:
generate the simulated environment based on a random selection of various unique character profiles from the database.

11. The system of claim 8, wherein the processor is configured to execute the instructions and cause the processor to:
classify the road type, the environment lighting condition, and the trajectory of the AV as one of a finite number of feature vectors using heuristic rules.

12. The system of claim 8, wherein the processor is configured to execute the instructions and cause the processor to:
convert the one or more object types and the respective trajectories into feature vectors based on providing sensor data corresponding with a trajectory of a respective object through a respective environment to an autoencoder neural network to generate a respective vector representing one or more behavioral attributes of the object in the environment.

13. A non-transitory computer-readable medium comprising instructions, the instructions, when executed by a computing system, cause the computing system to:
collect scene data about an environment around an autonomous vehicle (AV), wherein the scene data represents a driving scene encountered by the AV;
process the scene data into feature embedding vectors that represent features of the driving scene, wherein each of the plurality of feature vectors comprises a string of numbers, each number corresponding to how many times a respective character profile appears in a corresponding environment, wherein the string of numbers comprises a first number representing a presence of a T-intersection, a second number representing a dim brightness level, a third number representing a direction of travel of the AV, a fourth number representing how many oncoming vehicles are turning into a same lane as the AV, a fifth number representing how many pedestrians have trajectories crossing relatively close across a trajectory of the AV, and a sixth number representing how many pedestrians have trajectories crossing relatively far across the trajectory of the AV;
store the feature embed vectors as character profiles in a scene database; and
generate a simulated environment based on a random selection of various unique character profiles from the scene database including at least one of the features embedding vectors.

14. The non-transitory computer-readable medium of claim 13, the represented features include a road type, an environment lighting condition, one or more object types, a trajectory of the AV, or a combination thereof.

15. The non-transitory computer-readable medium of claim 14, wherein the non-transitory computer-readable medium further comprises instructions that, when executed by the computing system, cause the computing system to:
store a plurality of feature vectors to a scene database, wherein each of the plurality of feature vectors represents a road type, an environment lighting condition, one or more object types and respective trajectories, a direction of the AV, or a combination thereof.

16. The non-transitory computer-readable medium of claim 15, wherein the non-transitory computer-readable medium further comprises instructions that, when executed by the computing system, cause the computing system to:
generate the simulated environment based on a random selection of various unique character profiles from the database.

17. The non-transitory computer-readable medium of claim 14, wherein the non-transitory computer-readable medium further comprises instructions that, when executed by the computing system, cause the computing system to:
classify the road type, the environment lighting condition, and the trajectory of the AV as one of a finite number of feature vectors using heuristic rides.

* * * * *